US009495659B2

(12) United States Patent
Shanken et al.

(10) Patent No.: US 9,495,659 B2
(45) Date of Patent: Nov. 15, 2016

(54) APPARATUS, METHOD, AND A COMPUTER PROGRAM FOR A FORM IDENTIFICATION NUMBER

(76) Inventors: Ross Shanken, Gwynedd Valley, PA (US); Atul Patel, Irvine, CA (US)

( * ) Notice: Subject to any disclaimer, the term of this patent is extended or adjusted under 35 U.S.C. 154(b) by 382 days.

(21) Appl. No.: 13/111,940

(22) Filed: May 19, 2011

(65) Prior Publication Data

US 2012/0296985 A1   Nov. 22, 2012

(51) Int. Cl.
*G06Q 10/10*   (2012.01)
*G06F 21/62*   (2013.01)

(52) U.S. Cl.
CPC ........... *G06Q 10/10* (2013.01); *G06F 21/6209* (2013.01); *G06F 21/6245* (2013.01)

(58) Field of Classification Search
CPC ........... G06F 21/6209; G06F 21/6245; G06F 17/30861; G06F 17/30876; G06Q 10/10; G06Q 30/0255; H04L 67/22; H04L 67/20; H04L 67/02
USPC ....... 709/206, 208, 209, 217, 218, 219, 227, 709/228, 229; 715/221, 222, 223, 224; 713/159, 172, 183, 185, 170; 705/65, 705/66, 14.1, 14.16, 14.52, 7.13–7.19; 726/9; 707/607, 608, 705, 769
See application file for complete search history.

(56) References Cited

U.S. PATENT DOCUMENTS

| | | | |
|---|---|---|---|
| 6,826,594 B1 * | 11/2004 | Pettersen | 709/203 |
| 7,577,587 B2 | 8/2009 | Gee | |
| 7,827,057 B1 * | 11/2010 | Walker et al. | 705/14.33 |
| 8,065,264 B1 | 11/2011 | Achanta | |
| 8,103,546 B1 * | 1/2012 | Des Jardins et al. | 705/14.73 |
| 8,229,819 B2 * | 7/2012 | Ransom et al. | 705/35 |
| 8,505,106 B1 * | 8/2013 | Bhosle | H04L 9/3213 709/206 |
| 8,595,058 B2 * | 11/2013 | Fordyce et al. | 705/14.1 |
| 8,849,746 B2 * | 9/2014 | Candea et al. | 707/602 |
| 8,983,855 B1 | 3/2015 | Bombalier | |
| 2002/0010784 A1 * | 1/2002 | Clayton et al. | 709/229 |
| 2002/0065772 A1 * | 5/2002 | Saliba et al. | 705/40 |
| 2002/0107776 A1 * | 8/2002 | Bove | G06Q 30/02 705/37 |
| 2002/0116531 A1 * | 8/2002 | Chu | 709/246 |
| 2003/0084294 A1 * | 5/2003 | Aoshima et al. | 713/169 |
| 2003/0145103 A1 * | 7/2003 | Pruyne et al. | 709/237 |
| 2004/0117247 A1 * | 6/2004 | Agrawal et al. | 705/14 |
| 2004/0195310 A1 * | 10/2004 | Silverbrook et al. | 235/375 |
| 2004/0230494 A1 * | 11/2004 | Lotvin et al. | 705/26 |
| 2005/0097204 A1 * | 5/2005 | Horowitz | G06Q 30/02 705/14.69 |
| 2005/0188007 A1 * | 8/2005 | Warner et al. | 709/203 |
| 2005/0203809 A1 * | 9/2005 | Stone et al. | 705/27 |
| 2005/0278289 A1 * | 12/2005 | Gauweiler et al. | 707/1 |

(Continued)

OTHER PUBLICATIONS

"New LeadIdentity Brings Transparency and Quality Into Control", LeadCritic, Mar. 24, 2008, http://blog.leadcritic.com/lead-management/lead-verification/new-leadidentity-brings-transparency-and-quality-into-control.

(Continued)

*Primary Examiner* — Pao Sinkantarakorn
*Assistant Examiner* — Michael Phillips
(74) *Attorney, Agent, or Firm* — LeonardPatel PC

(57) ABSTRACT

Embodiments of the present invention pertain to an apparatus and a method that are configured to receive a request to generate a form identification number for a particular form and generate a form identification number for the particular form in response to the request. The apparatus and method also configured to transmit a message comprising the form identification number to a form generator.

8 Claims, 7 Drawing Sheets

(56) References Cited

U.S. PATENT DOCUMENTS

| | | |
|---|---|---|
| 2006/0015469 A1 | 1/2006 | Whitehouse |
| 2006/0064340 A1* | 3/2006 | Cook .............................. 705/10 |
| 2006/0077444 A1* | 4/2006 | Lum et al. .................... 358/1.15 |
| 2006/0265495 A1* | 11/2006 | Butler et al. .................. 709/224 |
| 2007/0090185 A1* | 4/2007 | Lewkowitz .......... G06Q 20/343 235/383 |
| 2007/0256124 A1* | 11/2007 | Ih et al. ............................. 726/9 |
| 2007/0289002 A1* | 12/2007 | van der Horst et al. ......... 726/9 |
| 2008/0059288 A1* | 3/2008 | Kokernak ........................ 705/10 |
| 2008/0201204 A1 | 8/2008 | Rose et al. |
| 2008/0260267 A1* | 10/2008 | Goldberg et al. ............. 382/232 |
| 2008/0300962 A1* | 12/2008 | Cawston et al. ................ 705/10 |
| 2009/0006159 A1* | 1/2009 | Mohr et al. ........................ 705/7 |
| 2009/0055443 A1* | 2/2009 | Miyamoto et al. ........... 707/202 |
| 2009/0164477 A1* | 6/2009 | Ganguly ......................... 707/10 |
| 2009/0193507 A1* | 7/2009 | Ibrahim ............................. 726/9 |
| 2009/0210392 A1* | 8/2009 | Agranoff et al. ................. 707/3 |
| 2009/0248492 A1* | 10/2009 | Lloyd ............................. 705/10 |
| 2010/0257012 A1* | 10/2010 | Walker ............ G06Q 10/06314 705/345 |
| 2010/0257354 A1* | 10/2010 | Johnston et al. ............. 713/153 |
| 2011/0055021 A1* | 3/2011 | Haag ..................... G06Q 30/02 705/14.69 |
| 2011/0213670 A1 | 9/2011 | Strutton et al. |
| 2011/0231230 A1* | 9/2011 | Christon et al. ............. 705/7.42 |
| 2011/0231240 A1* | 9/2011 | Schoen et al. ............. 705/14.41 |
| 2011/0258016 A1* | 10/2011 | Barak .................... G06Q 30/02 705/7.29 |
| 2011/0289106 A1* | 11/2011 | Rankin et al. ................ 707/769 |
| 2012/0030054 A1* | 2/2012 | Zamani ........................ 705/26.3 |
| 2012/0191582 A1* | 7/2012 | Rance .................... G06Q 30/02 705/34 |
| 2012/0290491 A1* | 11/2012 | Rafferty et al. .............. 705/317 |

OTHER PUBLICATIONS

Isaac M. Woo, "Final Office Action" issued on Aug. 19, 2014 for U.S. Appl. No. 13/925,716.
Isaac M. Woo, "Non-Final Office Action" issued on May 28, 2014 for U.S. Appl. No. 13/925,716.
Tim B. Hale, "Non-Final Office Action" issued on Nov. 18, 2015 for U.S. Appl. No. 13/761,578.
Isaac M. Woo, "Notice of Allowance" issued on Oct. 3, 2014 for U.S. Appl. No. 13/925,716.
Tim B. Hale, "Final Office Action" issued on Mar. 11, 2016 for U.S. Appl. No. 13/761,578.

* cited by examiner

APPARATUS, METHOD, AND A COMPUTER PROGRAM FOR A FORM IDENTIFICATION NUMBER

FIELD

The present invention relates to a form identification number and, more particularly, to automatically creating, auditing, storing and capturing the identity of a digital form via a form identification number.

BACKGROUND

Digital forms are a prevalent mechanism to collect data across multiple electronic devices today, including computers and mobile devices. Such digital forms are utilized on websites and within software applications. The party that is responsible for the creation and operation of the digital form can be referred to as a "form generator." The general purpose of a form is to collect information from an individual who enters the information on a form ("form data") from a device that may be connected to a network including, but not limited to the Internet, or a device that will connect to the network at a future point. The form data is then usually populated into a database for multiple potential uses, including, but not limited to, communicating with the individual, targeting advertising to the individual, or selling the form data to another organization for use thereof, presumably with the individual having given permission for any of these uses of the form data that he or she has entered.

Form generators, and other associated parties, use multiple first-party and third-party systems to attach, verify, and analyze details about the form data and the associated information about the form event, such as the time and date the form was created, the identity of the form generator, where the form was created (the specific web site or application), the form data itself, and information associated with the device of the person who entered the form data, such as browser or application type and version, the internet protocol (IP) address, machine/device identifiers, etc. Many companies do not track all of these forensics or may not track any forensics, as the tracking thereof may be difficult. Those who do attempt to collect and/or share such forensic data often use disparate systems, as well as systems often having conflicting commercial interests in sharing the data and ensuring that the data is accurate. Therefore, when organizations attempt to share form data across their own organizations or with other organizations, there is not (1) a standard methodology and/or technology to do so; (2) a standard set of forensics which is available to be utilized; or (3) an unbiased system whose only commercial interest is making item number 1 and item number 2 available.

Because of this lack of a standard methodology, the difficulty of collecting forensic data, and the commercial biases of the parties involved, it is generally not possible for an organization reviewing data that is being presented as form data to have certainty about whether the data being shared actually came from a form being completed by an individual (in other words, it may not actually be form data). Because data that is in a database could have been created in multiple ways other than by a human entering the data in a digital form, reviewing the data alone gives no understanding about whether the data came from a digital form that was completed by a human. Also, it is generally not possible for an organization reviewing data that is being presented as form data to have certainty about whether or not the desired forensic information associated with the form is available. In the case where the desired forensic information associated with the form is available, it becomes impossible for an organization to have certainty about whether the information will be accurate and presented without commercial bias. There are multiple reasons why the forensic information may not be present or may be inaccurate, including, for example, the lack of appropriate systems or technical ability on the part of the form generator to track this information, or in some cases, intentional deception on the part of the form generator or data seller. For example, a data seller may represent that data was form data very recently entered, when in fact the data is old; or an entity may sell data from a customer relationship management (CRM) database and represent that an individual entered the data in a digital form, when in fact the individual did not do so.

SUMMARY

Certain embodiments of the present invention may provide solutions to the problems and needs in the art that have not yet been fully identified, appreciated, or solved by current digital forms and/or digital form auditing systems or applications.

In accordance with an embodiment of the present invention, a computer-implemented method is provided that includes receiving, at a server, a request to generate a form identification number for a particular form. The method also includes generating a form identification number for the particular form and transmitting a message comprising the form identification number to a form generator.

In another embodiment of the present invention, an apparatus is provided that includes a processor and memory having a set of instructions. The set of instructions cause the processor to receive a request to generate a form identification number for a particular form. The processor is also configured to generate a form identification number for the particular form and transmit a message having the form identification number to a form generator.

In yet another embodiment of the present invention, a computer-implemented method is provided that includes receiving, from a requestor, a request message related to an event at a server. The method also includes determining whether the event is related to generating a form identification number, auditing of a previously created form identification number, or a third-party contribution to the previously created form identification number. The method further includes transmitting a response message based on the request message.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One or more embodiments described herein pertain to the generation of a form identification number (FIN) each time a form is created, as well as verification or auditing of form data utilizing a FIN associated with the form data. It should be appreciated that in some business contexts, the form data can be construed as a lead.

Figure 1:
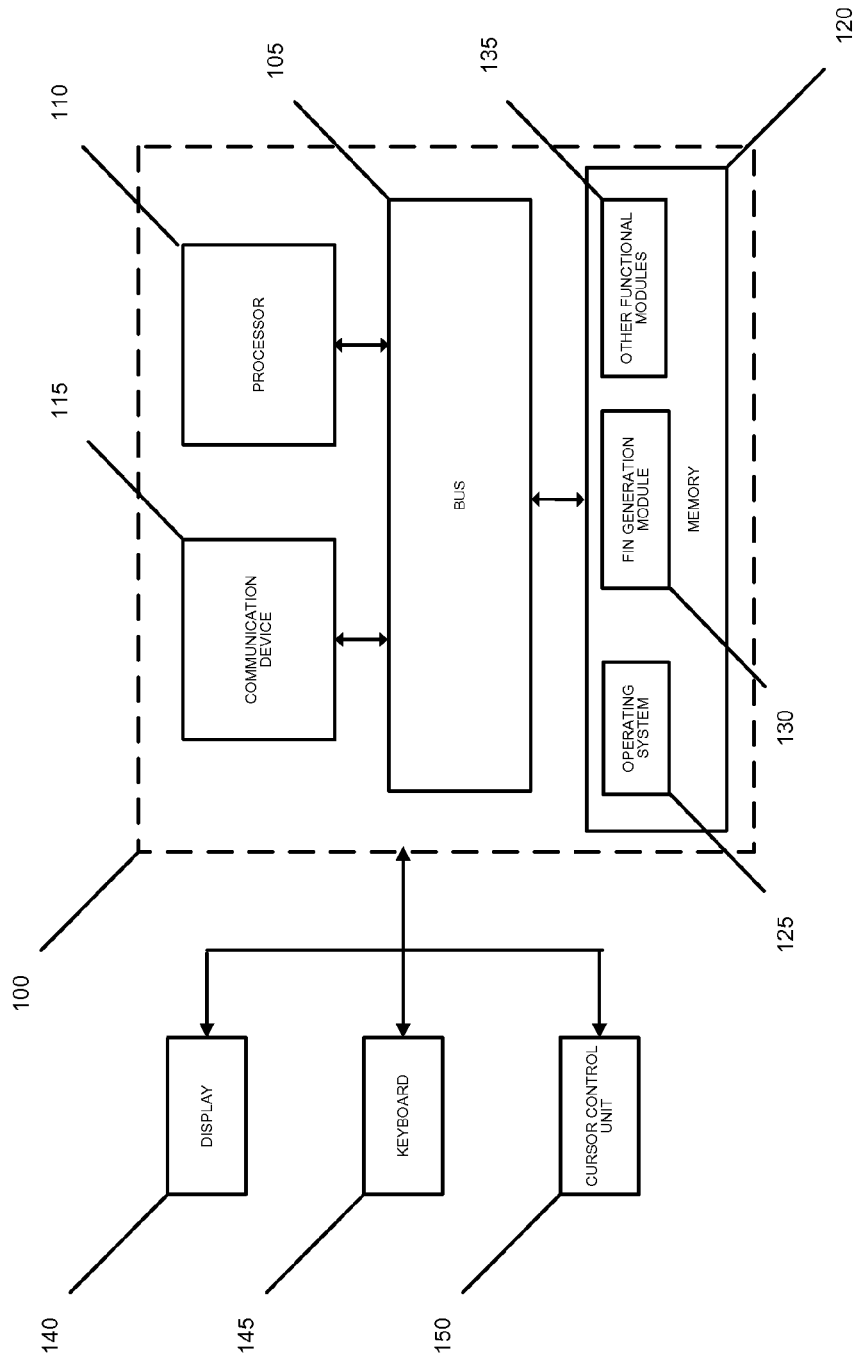
FIG. 1 illustrates a block diagram of a system that can be implemented in one or more embodiments of the present invention.

FIG. 1 illustrates a block diagram of a system 100 that can be implemented in one or more embodiments of the present invention. System 100 may include a bus 105 or other communication mechanism that can communicate information and a processor 110, coupled to bus 105, that can process information. Processor 110 can be any type of general or specific purpose processor. System 100 may also include a memory 120 that can store information and instructions to be executed by processor 110. Memory 120 can be comprised of any combination of random access memory ("RAM"), read only memory ("ROM"), static storage such as a magnetic or optical disk, or any other type of computer readable medium. System 100 may also include a communication device 115, such as a network interface card, that may provide access to a network.

The computer readable medium may be any available media that can be accessed by processor 110. The computer readable medium may include both volatile and nonvolatile medium, removable and non-removable media, and communication media. The communication media may include computer readable instructions, data structures, program modules, or other data and may include any information delivery media.

Processor 110 can also be coupled via bus 105 to a display 140, such as a Liquid Crystal Display ("LCD"). Display 140 may display information to the user, such as a fillable or non-fillable form. A keyboard 145 and a cursor control unit 150, such as a computer mouse, may also be coupled to bus 105 to enable the user to interface with system 100.

According to one embodiment, memory 120 may store software modules that may provide functionality when executed by processor 110. The modules can include an operating system 125 and a form identification number (FIN) generation module 130, as well as other functional modules 135. Operating system 125 may provide operating system functionality for system 100. Because system 100 may be part of a larger system, system 100 may include one or more additional functional modules 135 to include the additional functionality. For instance, other functional modules 135 may include, but not limited to an auditing module, a storage or capturing module of the digital form's identity, an additional data capturing module, or any other module that would be appreciated by a person of ordinary skill in the art.

Figure 2:
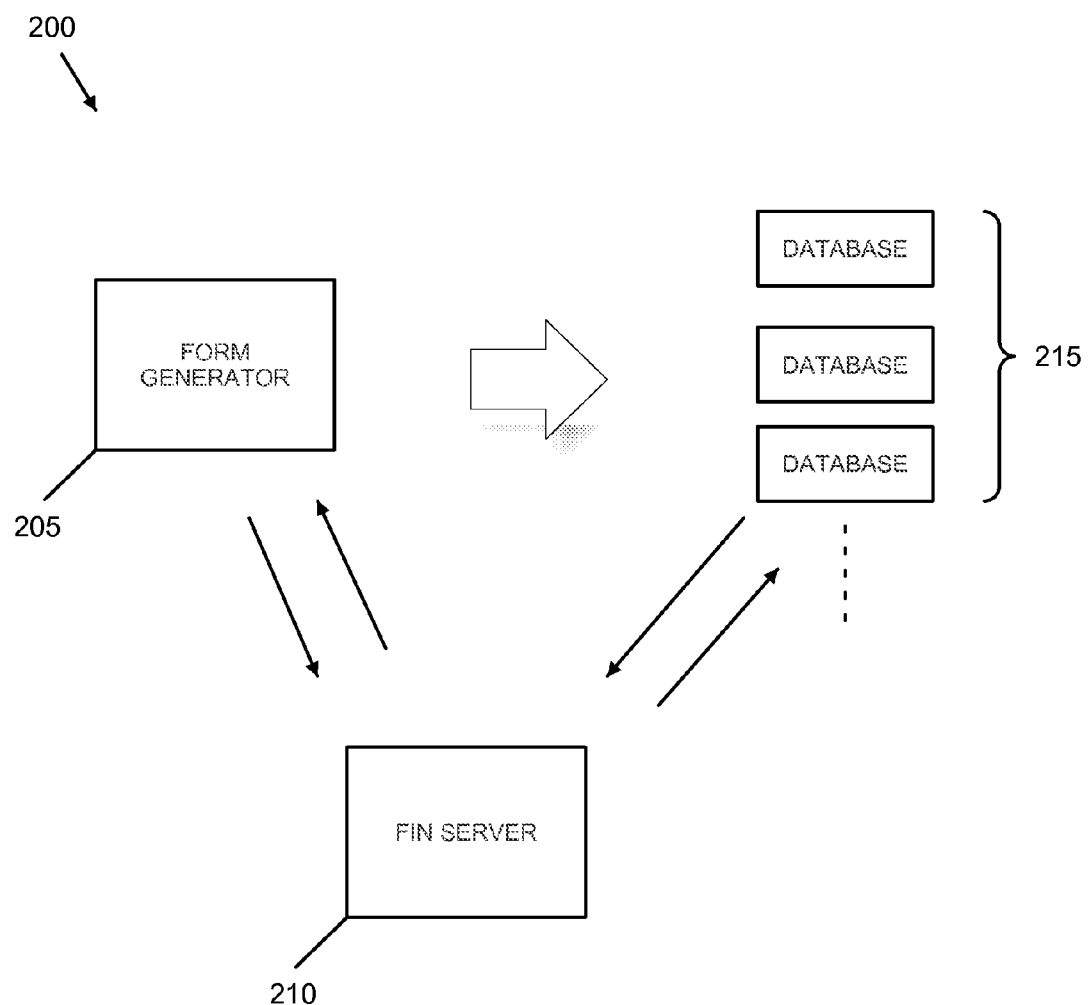
FIG. 2 illustrates a form identification number (FIN) system, in accordance with one or more embodiments of the present invention.

FIG. 2 illustrates a form identification number (FIN) system 200, in accordance with one or more embodiments of the present invention. System 200 includes, but is not limited to, a form generator 205, a FIN server 210, and a plurality of databases (or third party services) 215.

In this embodiment, form generator 205 is configured to create a form using a software application embodied on a server, a network, a computer, personal digital assistant (e.g., iPhone®, Blackberry®, etc.) or any means that would be appreciated by a person of ordinary skill in the art. Form generator 205 then submits a request to FIN server 210 to create a FIN. The request for the FIN can be made prior to the consumer interacting with the form.

When FIN server 210 receives the request, FIN server 210 generates a FIN for the particular form. However, it should be appreciated that FIN server 210 is not limited to a server, but can be any machine that embodies a FIN generating application, auditing application, etc. FIN server 210 is then configured to transmit a response to form generator 205. The response can include programmable instructions (i.e., code or JavaScript) and the FIN having a unique identification number for the particular form. The code can be used to append the FIN to the particular form. For instance, the code may be configured to direct, for example, the Web browser to apply the FIN to the particular form. It should be appreciated that the FIN may be hidden in the form and may not be viewable by a consumer or any individual interacting with the form. The code can also perform subsequent actions such as populating a hidden field within the particular form with the form identification number, making a call to other code on a page, and/or alerting a user. It should also be appreciated that the code can be used to update a visible or hidden field within the particular form, update the particular form, or configured to perform any function that would be appreciated by a person of ordinary skill in the art.

In some embodiments, it should be appreciated that the creation of a unique identifier can also be provided to the individual interacting with the digital form. The unique identifier will also remain associated with the FIN. For instance, at the time of creating the FIN, FIN server 210 can respond with the FIN and necessary code to add the unique identifier to the form and/or make it accessible to other code on the webpage or application. In this case, form generator 205 can choose to use its own certified code to utilize the FIN programmatically or can utilize a provided set of code by FIN server 205 to provide consumers with a the unique FIN, or a separate, unique, consumer-facing FIN, which will remain associated with the original FIN, and a third-party verification image and/or feedback mechanism to allow consumers to verify their own FIN (when interacting with the form generator or any other entity who has gained access to the form data in the future) and to contribute their own information related to the FIN, such as a positive endorsement of the interaction or submitting a complaint about the interaction.

Once the consumer enters data into the form and chooses an option indicating he/she has completed the data entry (usually by clicking a "submit" button of some sort), form generator 205 is configured to transmit the data, which includes the online form and the FIN associated with the online form (e.g., in a hidden field), to one or more of databases 215. The one or more databases 215 may be an entity or person purchasing the form data or lead, and each of these entities or persons may in turn transmit the data to other databases, and so on.

Each database 215 is configured to query FIN server 210 (in real-time) and audit a FIN generated by FIN server 210. For instance, any party (e.g., an auditor) who receives a FIN can audit forensic information associated with a FIN through an Application Programming Interface (API) or through an application interface such as a web browser or application. The auditor can audit the FIN or part of or of all of the form data associated with the FIN, which the auditor seeks to verify or capture. To protect certain forensic information from becoming public, the FIN server 210 can classify forensic information as global forensic data (that is always available for disclosure) or non-global forensic data. Non-global forensic data is data where form generators or other contributors may choose whether such data will become available for disclosure globally.

For example, form generator 205 can set data sharing parameters, i.e., set different levels of data sharing or transparency. It should also be appreciated that the FIN server 210 can set data sharing parameters. For example, the following parameters may be available: "No Choice", "No Sharing", "Sharing within Entity Only", "Share with All", and "Verification Only". "No Choice" can be a parameter set by FIN server 210 that allows FIN server 210 to systematically capture some or all available data from data contributors (e.g., form generators 205, auditor, or a third-party contributor). Information captured under "No Choice" may be, but is not limited to, information regarding when an audit took place, when a form was created, or any information that FIN server 210 determines should be captured and shared. "No Sharing", "Sharing within Entity Only", "Share with All" and "Verification Only" can be parameters set by form generator 205 and/or the auditor.

Based on the request from the auditor and the classification of the forensic information, FIN Server 210 is configured to transmit results of the audit to database 215 (e.g., the auditor). The results may include, but are not limited to, raw forensic information, such as the time, place and location of the created form, who created the form, what purpose the form was created for, whether the form was actually created, whether additional information was added to the form at a later date, history information, such as how many times has the FIN has been viewed, who has audited the FIN, device data, such as browser or application information, IP address where form was rendered, derived or scored data, such as likelihood of fraud, and finally contributed data, such as an individual commenting on a particular form event, or a form auditor commenting on a form event, etc.

When an auditor or database 215 audits a FIN stored in FIN server 210, FIN Server 210 is configured to capture and store a FIN audit action. For instance, FIN Server 210 may capture and store the FIN audit action and any information associated with the FIN audit action, such as the auditor's information (company name, account number, etc.), the date and time of the audit, the reason for the audit, the form data being audited, and/or any information that would be associated with the audit action.

Furthermore, FIN server 210 can capture at least two types of data: passive data and active data. Passive data can be forensic data that FIN server 210 captures automatically, such as the date and time of form creation, the date and time of an audit, the location of a form, or any other data that would be appreciated by a person of ordinary skill in the art. Active data can be data that is contributed by an outside entity, i.e., an organization or a website visitor who has interacted with the form.

FIN server 210 can also protect certain audit information from becoming publicly available. For instance, FIN server 210 can classify available audit forensics as global forensic data (i.e., data that is always available for disclosure) or non-global forensic data (i.e., data that may be disclosed but is subject to the discretion of the auditor). With this information available, the FIN may be utilized as a mechanism to track form data throughout its existence across multiple databases.

The presumed usage would be for a form generator to store the FIN within its own database systems, and whenever sharing the data record (for free or when selling), include the FIN as another field along with the data record. The party receiving the data record can then audit the forensic information associated with the FIN. As discussed in more detail below, since the auditing of actions becomes additional forensic information associated with the FIN, a party auditing the FIN in the future may know how many parties have been exposed to the particular FIN, as well as associated data such as the reason for the audit, the information being audited, and any additional auditing forensics that may be useful for tracking the history of the form data.

Figure 3:
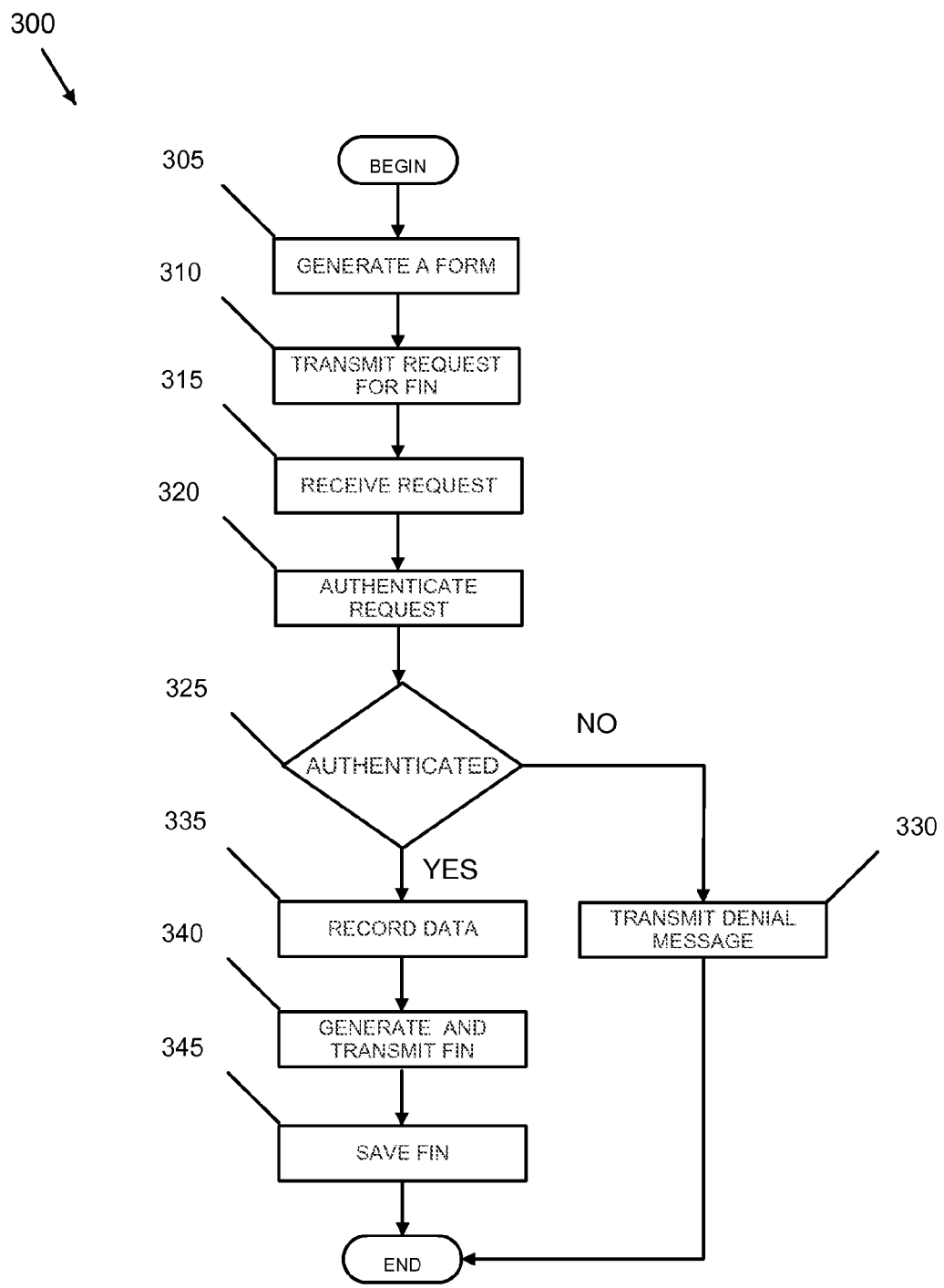
FIG. 3 illustrates a method for generating a FIN, in accordance with an embodiment of the present invention.

FIG. 3 illustrates a method 300 for generating a form identification number (FIN), in accordance with an embodiment of the present invention. Any party who receives a FIN can audit the forensic data associated with the FIN through an API or through an application interface such as a Web browser or application. At 305, a form is generated by a form generator using a website or software application. It should also be appreciated that the form generator can generate one or more forms simultaneously or sequentially. The form includes, amongst other fields, a hidden field, i.e., a target input field. The target input field can include the FIN that will be generated by the FIN server.

At 310, the form generator transmits a request to a FIN server requesting a FIN be generated and associated with the generated form. The FIN server at 315 receives the request and authenticates the form generator at 320 by verifying the form generator's identification (ID). The request can include a token associated with the form generator, as well as another token (or campaign key) associated with a grouping of form identification numbers. In another embodiment, the token associated with the form generator can be a password, and the other token can be the form generator's campaign key to associate a particular form event with a particular campaign, and any other information that would be appreciated by a person of ordinary skill in the art.

In order to organize different sets of form data, as well as define different settings for different groups (e.g. which information will be globally available, which will not), a form owner may define different campaigns, each with its own settings, and also utilized to group similar leads together. For example, if a particular set of leads were generated by a particular advertising tactic, a form owner might define a campaign called "ad tactic 1" where they choose to make all the forensic information globally available. When generating forms that fall into that category, they will utilize code that includes information as part of the FIN request that establishes with the FIN Servers that these FINs should make the forensic information globally available and should be grouped into campaign "ad tactic 1" for reporting and auditing purposes.

If the authentication fails at 325, then the request is denied and the form generator is notified accordingly at 330. If, however, the authentication passes at 325, then the FIN server, using server side data that comes from the HTTP request, records at 335 the following data: the Uniform Resource Locator (URL) of the requestor, the Internet Protocol (IP) address of the requestor, the browser type of the requestor, etc. The information being recorded can be considered passive data that is automatically recorded.

Also, as mentioned above, the FIN server can also record other data based on the transparency settings of the form generator. For example, if the form generator allows the FIN server to record all information about the form, then the FIN server will collect all of the information regarding the form. In the alternative, if the form generator allows the FIN server to record limited amounts of information regarding the form, then the FIN server will collect the limited information regarding the form.

At 340, the FIN server generates the FIN and/or transmits the FIN along with a custom JavaScript (or code) to populate the hidden or visible form field with the FIN. In the alternative, the FIN server can generate the FIN and populate the hidden or visible form field on the server side and then transmit the FIN to the form generator. In an alternative embodiment, the code can also perform subsequent actions such as populating a hidden field within the particular form with the form identification number, making a call to other code on a page, and/or alerting a user. It should also be appreciated that the code can be used to update a visible or hidden field within the particular form, update the particular form, or configured to perform any function that would be appreciated by a person of ordinary skill in the art.

The FIN is then saved at 345 on the form generator's database or another third-party database, such as a CRM system. In this embodiment, each FIN (or lead) is associated with a form that was rendered at a particular point in time, at a particular website or within a particular software application, and includes indicators that determine whether the form was completed by an actual human by utilizing available data points and/or human-recognition or bot-recognition technologies. If data points are not present, the FIN may not be created or may be created but associated with flags to notify an auditing entity of such issues. Each FIN will always be unique, and will be stored and linked to the forensic data that is associated with the unique FIN. This allows for any party to audit the FIN at a future point in time and obtain the forensic data that is associated with the form's generation, or potentially uncover the likelihood of whether the data is in fact form data at all.

Figure 4:
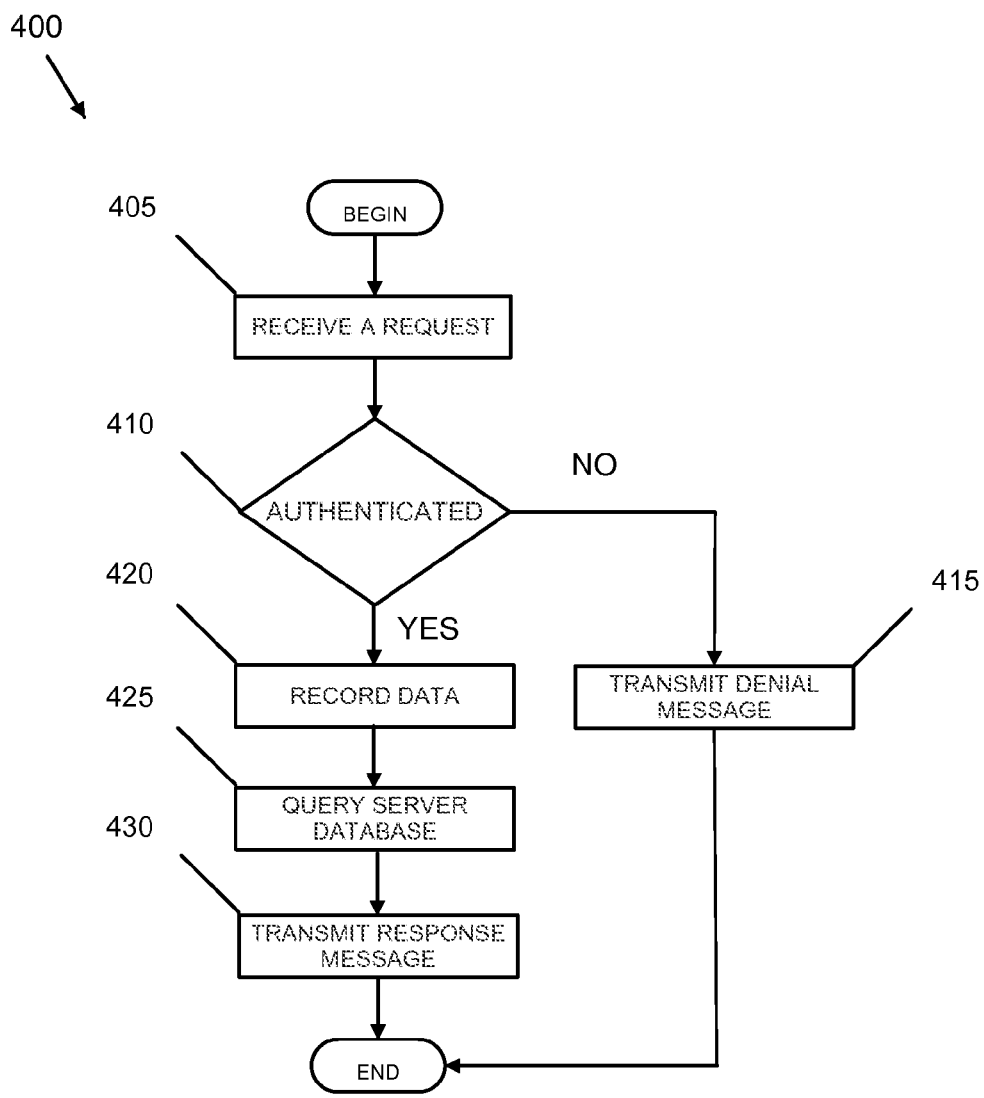
FIG. 4 illustrates a method for auditing a FIN, in accordance with an embodiment of the present invention.

FIG. 4 illustrates a method 400 for auditing a FIN, in accordance with an embodiment of the present invention. When, for example, a FIN or lead is sold to another entity (i.e., a bank), the FIN is transmitted to the other entity. The entity (or auditor) may want to audit or verify the FIN and its history. In other words, the entity may want to check whether the lead they are buying is a good lead, a bad lead, or a moderate lead.

At 405, the FIN Server receives from an auditor, for example, a request to audit a particular FIN stored in the FIN server. The request may also include the FIN, a token (i.e., a password for the entity), and a request message that queries the FIN server for information regarding the lead. The request message may request some or all information related to the FIN. At 410, the FIN server authenticates the auditor based on the token provided by the auditor. At 415, the FIN server transmits an error message to the auditor if the authentication fails.

If the authentication passes, then at 420 the FIN server records information (or captures data) regarding the audit. For instance, for each audit of the particular FIN, the FIN server records information (or captures data) regarding the audit, the purpose of the audit, the parameters of the query, etc. The information being recorded can be considered passive data (i.e., "No Choice") that is automatically recorded.

The FIN server can also record active data, i.e., data that the auditor wants to share. As mentioned above, the auditor may set data sharing parameters, such as "No Sharing", "Sharing within Entity Only", "Share with All" and "Verification Only", to allow the FIN server to capture or record data the auditor wants to share or make available to the public. For example, an auditor might not want anyone to know they've audited a FIN, and therefore might set the data sharing for that parameter as "no sharing." Alternatively, the auditor might want to make the time of their audit known globally and would, in this case, set the data sharing to "Share with All." This allows the information regarding the FIN to be updated every time a particular FIN is audited, as well as allow any future auditor to obtain information regarding past or previous audits on the particular FIN.

At 425, the FIN server queries its database for a FIN. The query can be based on the transparency settings set by the actual creator (i.e., form generator) and/or previous auditors as well as contributors. In other words, the query can pull up information regarding a particular FIN based on the access level set for the particular FIN by the form generator, the auditor, and/or contributors to the particular FIN.

At 430, the FIN server then returns a response message to the auditor making the request. The response message may include information based on the transparency settings set by the creator, the auditor and/or contributor, as well as include information based on the information requested by the entity. For instance, the following information or data may be returned to the auditor: raw data, verified data, and scored data.

Raw data, for example, is any actively or passively collected data (associated with FIN Creation, FIN Audit, or FIN Contributions) with the appropriate transparency settings, and may be returned to the auditing party in its raw form. Verified data may be any actively or passively collected data (associated with FIN Creation, FIN Audit, or FIN Contributions) with the appropriate transparency settings, and may be returned to the auditing party as a verification that the data the auditing party has is the same as what is in the FIN servers, or if different, where and what those differences are. Scored data (or calculation of data) can be based on certain patterns of data and can return scores, or flags, that indicate the presence of those patterns. For example, if a certain IP address is generating multiple forms in a short period of time, the FIN server can track this and start to return scores or flags associated with any FINS that are associated with a particular IP address.

Figure 5A:
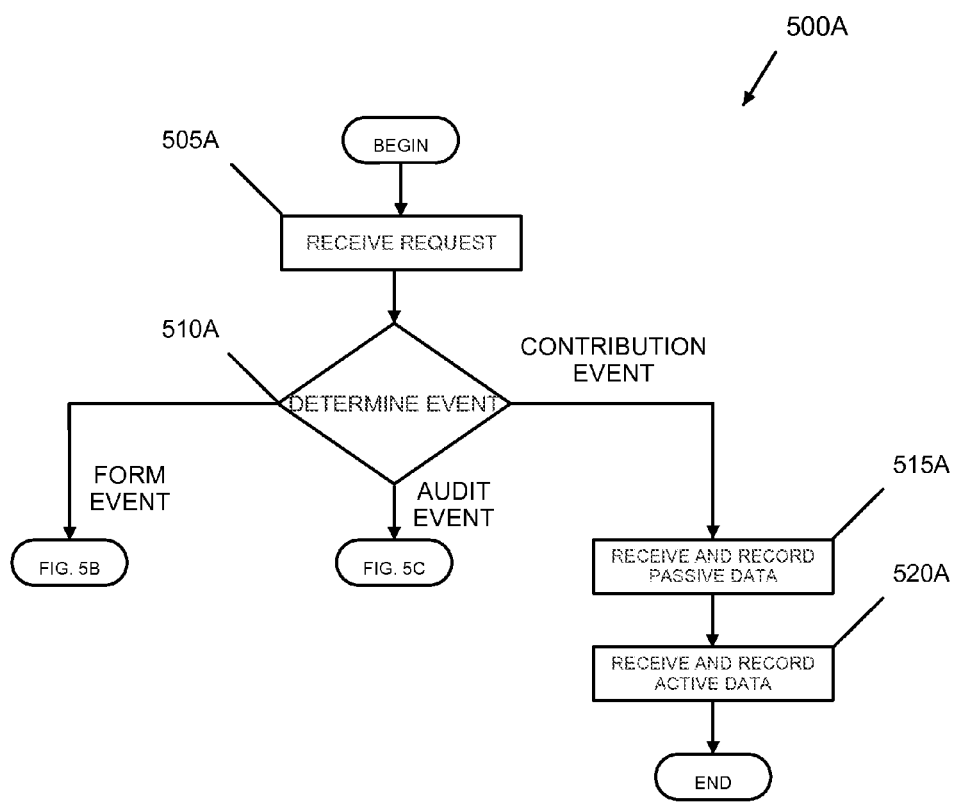
FIG. 5A illustrates a method for contributing or adding additional data occurring before, during, and after the creation of a FIN, in accordance with an embodiment of the present invention.

FIG. 5A illustrates a method 500A for contributing or adding additional data occurring before, during, and after the creation of the FIN, in accordance with an embodiment of the present invention. At 505A, a request message is received at the FIN server from a requestor (e.g., a form generator, an auditor, or a third-party contributor). At 510A, the FIN server determines what event the request message is related to. For instance, the FIN server may determine whether the event is related to a request for creating a FIN (e.g., Form Event), a request for auditing a FIN (e.g., Audit Event), a request to contribute additional data to the FIN (e.g., Contribution Event), or any event that would be appreciated by a person of ordinary skill in the art. In this embodiment, the contributor can be a FIN generator, a FIN buyer, a consumer, or any person or entity that would be appreciated by a person of ordinary skill in the art. If the request message is for creating a FIN, then the method proceeds to FIG. 5B. If the request message is for auditing a FIN, then the method proceeds to FIG. 5C.

If the request message is for contributing additional data, then the FIN server receives and records (or stores) passive data associated with the FIN at 515A. For instance, passive data can include the type of event, who made the request, why the request was made, or any information that would be appreciated by a person of ordinary skill in the art.

At 520A, the FIN server also receives and records (or stores) the active data associated with the FIN. For instance, when a form generator generates a FIN, the form generator can sell the FIN to a third party. The third party can then access the FIN server and contribute additional data regarding the FIN. This additional data can be considered active data. For example, the third party can report the purchase price for the FIN, whether the FIN was profitable, whether the FIN was corrupt, or any data that would be appreciated by a person of ordinary skill in the art.

A consumer can also contribute active data. For example, the consumer can access the FIN server and provide information regarding their experience with a form associated with the particular FIN. It should be appreciated that these are only some of the examples of how active data can be collected by the FIN server.

Figure 5B:
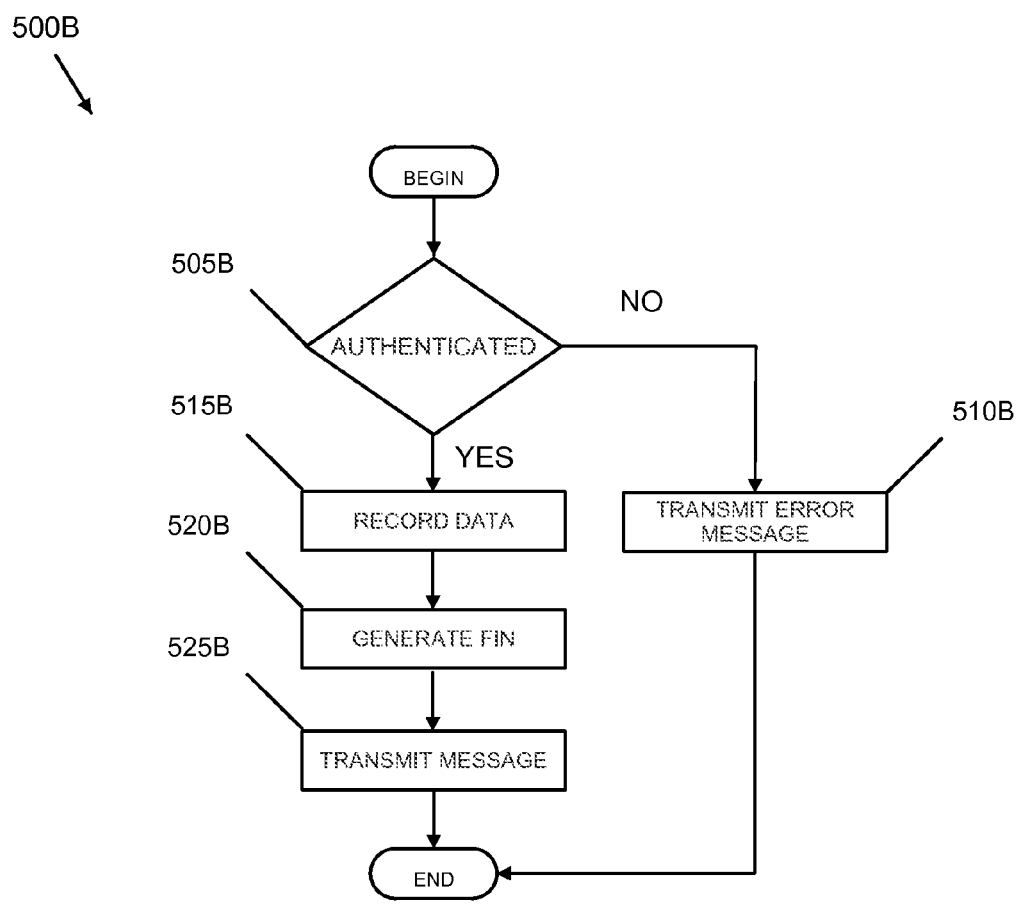
FIG. 5B illustrates a method for recording data when creating a FIN, in accordance with an embodiment of the present invention.

FIG. 5B illustrates a method 500 for recording data when creating a FIN, in accordance with an embodiment of the present invention. As described above, if the FIN server determines that the event relates to creating a FIN, then at 505B the FIN server determines whether the form generator is authenticated using a token associated with the form generator. If the form generator cannot be authenticated, then at 510B the FIN server transmits an error message to the form generator.

However, if the form generator is authenticated, then at 515B the FIN server collects or records data from the form generator. The data being collected can be active data and/or passive data. Depending on the transparency settings defined by the form generator, the FIN server collects active data from the form generator. The FIN server then generates a FIN at 520B and transmits a message to the form generator at 525B. The message can include the FIN, as well as relevant code to append the FIN to the form.

Figure 5C:
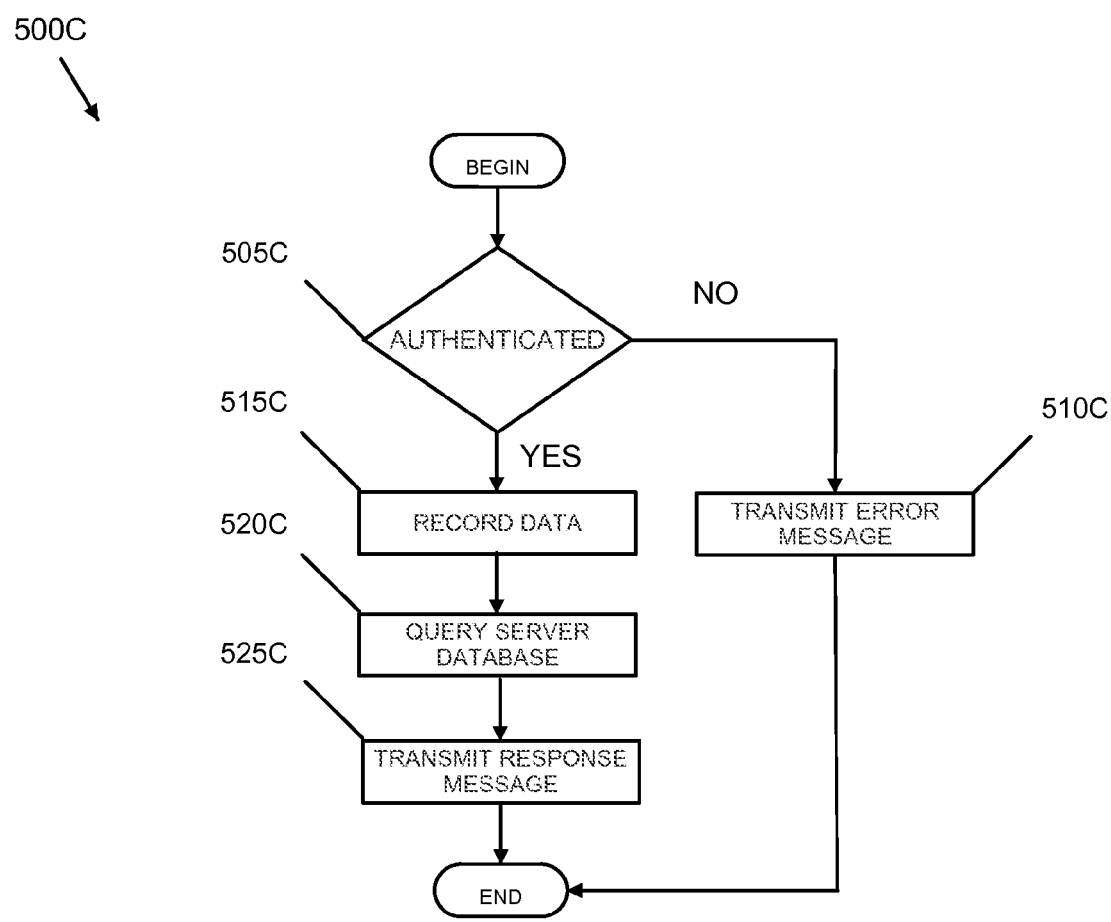
FIG. 5C illustrates a method for recording data when auditing a FIN, in accordance with an embodiment of the present invention.

FIG. 5C illustrates a method 500 for recording data when auditing a FIN, in accordance with an embodiment of the present invention.

As described above, if the FIN server determines that the event relates to auditing the FIN, then at 505C the FIN server determines whether the auditor is authenticated using a token associated with the auditor. If the auditor cannot be authenticated, then at 510C the FIN server transmits an error message to the auditor.

However, if the auditor is authenticated, then at 515B the FIN server collects or records data associated with the FIN from the form generator. The data being collected can be active data and/or passive data. Depending on the transparency settings defined by the auditor, the FIN server collects active data from the auditor. For example, the form generator can contribute active data such as information on how web traffic was driven to the form site associated with the particular FIN.

At 520C, the FIN server then queries its database for information associated with the FIN, as requested by the auditor. The FIN server then transmits a response message to the auditor with the information requested by the auditor at 525C.

The steps described in relation to FIGS. 2 to 5C are not limited by the order shown or described herein, but can be carried out in any order that will be appreciated by a person of ordinary skill in the art.

The method steps shown in FIGS. 2 to 5C may be performed, in part, by a computer program product, encoding instructions for a nonlinear adaptive processor to cause at least the methods described in FIGS. 2 to 5C to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the method described in FIGS. 2 to 5C, which may also be stored on the computer readable medium.

The computer product can be implemented in hardware, software, or a hybrid implementation. The computer product can be composed of modules that are in operative communication with one another, and which are designed to pass information or instructions to display. The computer program can be configured to operate on a general purpose computer, or an application specific integrated circuit ("ASIC").

The embodiments described herein allow for form data to be shared within organizations and/or with partner organizations. For example, companies struggle to share accurate data throughout their own organizations and/or with partners. Many organizations have attempted to create their own identification mechanisms, with varying degrees of success within a single organization, and the problem becomes exponentially more difficult across multiple organizations, each with different methodologies and standards. The FIN system addresses these issues with an automated, standard identification system and a third party managing the associated FIN forensics.

Also, data sellers and data buyers can now have a reliable method of certifying the following information: that data is or is not from online forms, when the data was created, who created the data, where was the data created, the history of the data, etc. The system also allows buyers to weed out deceptive sellers, as they will no longer be able to pass off their data as something that it isn't. There is a large and growing industry of "Lead Generation" where lead buyers and lead sellers suffer with these problems today, and the implementation of the FIN would resolve these issues.

Furthermore, the FIN system allows multiple organizations to enforce compliance, reduce or eliminate fraudulent or deceptive practices, and raise the overall quality of data and communications between organizations and individuals. This system also allows organizations that receive, buy or sell data from online forms the ability to participate in an independent, standardized and accurate method of ensuring that, when data is shared with an organization or across organizations, this data has an automated, fault-tolerant system, as described above, which indicates (1) whether or not the data came from an online form (if no FIN, then no certainty that the data is actually form data) and (2) that the associated data is present and accurate. There are multiple industries in which data is shared, bought and sold, a growing portion of the data being marketed as online form data, but without any way to verify that the data is form data, and if the data is form data, the verity of when the data was created, by whom, where, the associated individual characteristics of the person who completed the online form, as well as all the potential forensics associated with the data and the lack of ability to track the life of that data. The system also allows for linking with consumers to ensure that organizations, which receive data and communicate with the individuals represented within the data, have legitimate rights to communicate with the consumers.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method for a form identification number (FIN) system, comprising:
   creating, by a third party form generator, a form on a computing device using a web browser or a software application;
   submitting, by the third party form generator, a request to a FIN server to create a unique FIN, prior to a user interacting with the form;
   generating, by the FIN server, responsive to receiving the request, the unique FIN and programmable instructions associated with creating the form;
   transmitting, by the FIN server, the unique FIN and the programmable instructions to the third party form generator;
   appending, by the third party form generator, responsive to receiving the unique FIN and the programmable instructions, the unique FIN to the form by populating a hidden field within the form using the programmable instructions, wherein the unique FIN is hidden in the form and not viewable by the user;
   tracking, by the FIN server, the user interaction with the web browser or the software application associated with the unique FIN throughout existence of the unique FIN; and
   storing, by the FIN server, information associated with the user interaction with the web browser or the software application associated with the unique FIN.

2. The method of claim 1, wherein the request comprises a token associated with the third party form generator of the form and another token associated with a grouping of unique FINs.

3. The method of claim 2, further comprising:
   authenticating, by the FIN server, the third party form generator of the form prior to generating the unique FIN based on the token received in the request; and
   transmitting an error message to the third party form generator of the form when the authentication of the third party form generator of the form fails.

4. The method of claim 1, further comprising:
   recording data associated with generating the unique FIN for the form when the third party form generator of the form is authenticated.

5. The method of claim 1, wherein the form comprises attributes surrounding the form.

6. The method of claim 5, wherein the attributes comprise a date and time of the form, an origin of the user, a location of the form, and an owner of the form.

7. The method of claim 5, wherein the attributes comprise a date and time of the form, an origin of the user, a location of the form, an owner of the form, and the user interaction with the form.

8. A system for a form identification number (FIN), comprising:
   a third party form generator configured to
      create a form on a computing device using a web browser or a software application, and
      submit a request to a FIN server to create a unique FIN, prior to a user interacting with the form, wherein
   the FIN server is configured to
      generate, responsive to receiving the request, the unique FIN and programmable instructions associated with creating the form, and
      transmit, by the FIN server, the unique FIN and the programmable instructions to the third party form generator,
   the third party form generator is further configured to
      append, responsive to receiving the unique FIN and the programmable instructions, the unique FIN to the form by populating a hidden field within the form using the programmable instructions, wherein the unique FIN is hidden in the form and not viewable by the user, and
   the FIN server is further configured to
      track the user interaction with the web browser or the software application associated with the unique FIN throughout existence of the unique FIN, and
      store information associated with the user interaction with the web browser or the software application associated with the unique FIN.

* * * * *